United States Patent
Hasenzahl et al.

(10) Patent No.: US 6,714,193 B1
(45) Date of Patent: Mar. 30, 2004

(54) ARRANGEMENT FOR PROCESSING VIDEO DATA

(75) Inventors: Sieghard Hasenzahl, Riedstadt (DE); Martin Seitz, Ober-Ramstadt (DE); Lutz Buettner, Ilmenau (DE); Peter Rüffer, Schwülper (DE); Elmar Maas, Braunschweig (DE); Rolf Ernst, Braunschweig (DE)

(73) Assignee: Thomson Licensing S. A., Boulogne (FR)

( * ) Notice: Subject to any disclaimer, the term of this patent is extended or adjusted under 35 U.S.C. 154(b) by 0 days.

(21) Appl. No.: 09/204,180

(22) Filed: Dec. 3, 1998

(30) Foreign Application Priority Data

Dec. 12, 1997 (DE) ......................... 197 55 273

(51) Int. Cl.$^7$ .............................................. G06T 15/00
(52) U.S. Cl. ..................................................... 345/418
(58) Field of Search ................................. 345/418, 419; 370/230, 235, 463

(56) References Cited

U.S. PATENT DOCUMENTS

| | | | |
|---|---|---|---|
| 5,537,399 A | 7/1996 | Du | 370/58.2 |
| 6,222,852 B1 * | 4/2001 | Gandy | 370/463 |
| 6,252,544 B1 * | 6/2001 | Hoffberg | 342/357.1 |
| 6,262,991 B1 * | 7/2001 | Dyke et al. | 370/420 |
| 6,272,109 B1 * | 8/2001 | Pei et al. | 370/230 |

FOREIGN PATENT DOCUMENTS

EP 0388511 A2 9/2000

OTHER PUBLICATIONS

Eng et al., "A Wireless Broadband AD–HOC ATM Local–Area Network", Wireless Networks, Bd. 1, Nr. 2, Jul. 1995, Seiten 161–173, XP000524640.

Raychaudhuri et al., "WATMnet: A Prototype Wireless ATM System for Multimedia Personal Communication", IEEE International Conference on Communications (ICC), US, New York, IEEE, Seite 469–477, XP000625717.

* cited by examiner

Primary Examiner—Phu K. Nguyen
(74) Attorney, Agent, or Firm—Joseph S. Tripoli

(57) ABSTRACT

In an arrangement for processing digital video data there is provided for the most universal use of the arrangement and for a fast data exchange between components inside the arrangement. The arrangement utilizes at least one video data computer, at least one video data interface and at least one standard computer and/or one video hardware component, between which the video data can be exchanged through a fiber channel. The video data computer and the video interface(s) are controlled by at least one control computer via an Ethernet bus.

17 Claims, 1 Drawing Sheet

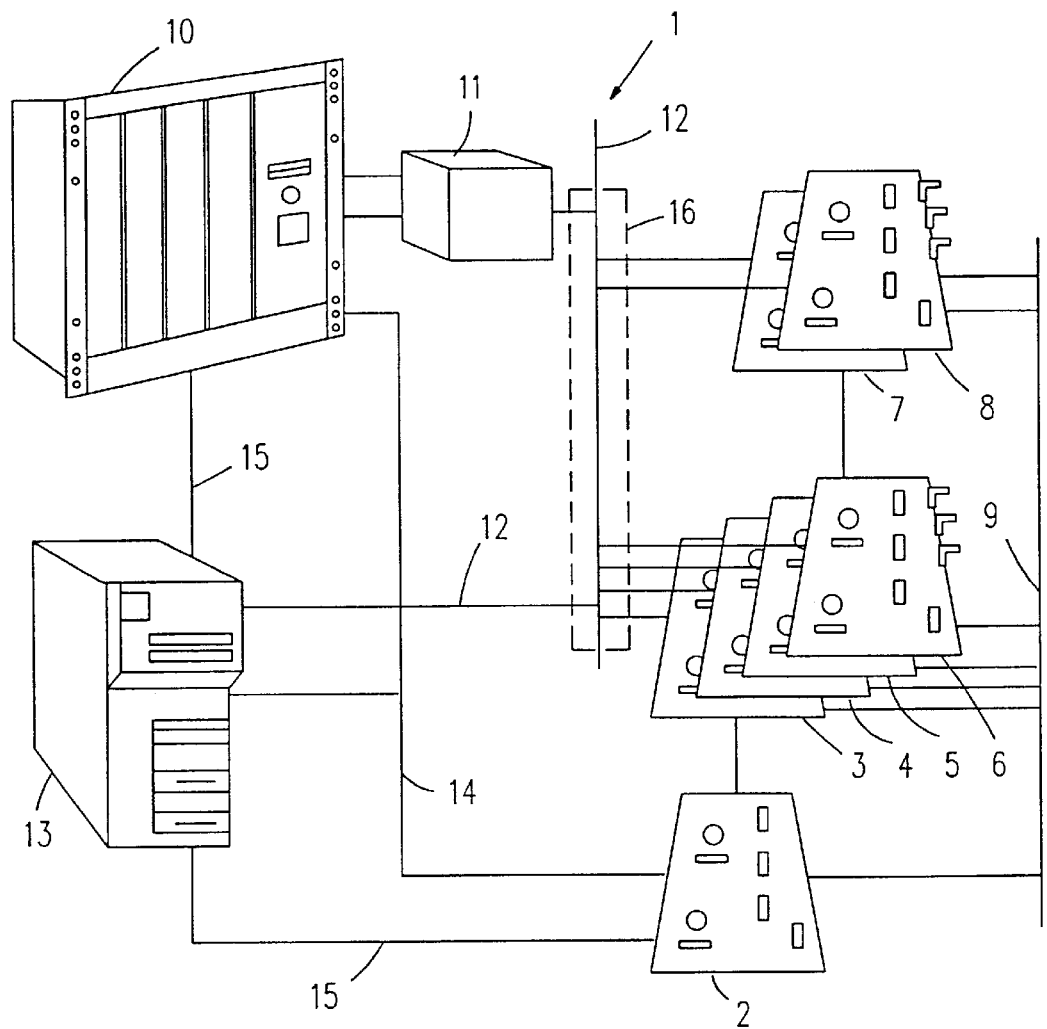

ARRANGEMENT FOR PROCESSING VIDEO DATA

BACKGROUND OF THE INVENTION

The invention relates to an arrangement for processing digital video data. In suchlike arrangements especially real-time processing poses problems due to the large number of datasets. This on the one hand because of the processing, but also because of the exchange of data between various components within the arrangement.

With state-of-the-art solutions there are particularly problems when components of various types are to be combined with each other in an arrangement, for example, video data interfaces, video hardware components which carry out certain dedicated processings of the video data, universally applicable video data computers and standard and control computers.

SUMMARY OF THE INVENTION

It is an object of the invention to provide an arrangement of the type defined in the opening paragraph having an improved data exchange between its components.

According to the invention this object is achieved in that the arrangement comprises at least one video data computer, at least one video data interface and at least one standard computer and/or one video hardware component between which video data can be exchanged through a fiber channel, and in that at least the video data computer and the video data interface(s) are controlled by means of at least one computer, more particularly the control computer via an Ethernet connection or an RS-422 connection.

For making a most universal use of an arrangement for processing digital video data and also for processing video data in real time in the fastest way possible, the arrangement includes video data computers which can be programmed universally and process video data in parallel as required. For supplying external video data and for transferring processed video data, at least one video data interface is provided. Furthermore, at least one standard computer is included which need not be modified and which may be, for example, a workstation or a personal computer. Special video hardware components are provided for taking over these fixedly assigned processing functions such as, for example, cross-fading, mixing, color blanking or similar functions. These video hardware components are suitable only for the dedicated purpose.

For a fastest possible data exchange between these components, the so-called fiber channel is provided according to the invention. This is a connection concept known per se for exchanging digital data, which is published in "Fibre Channel: Connection to the Future, The Fibre Channel Association, 1994, ISBN: 1-878707-19-1. The digital video data are exchanged through the fiber channel between the video data computers, the video data interface, the standard computer and the video hardware components. Since the fiber channel allows of a data rate of over 1 gigabit per second, the data exchange of the video data may be effected at such a rate that also a real-time processing and real-time handling of the video data by means of the arrangement is made possible.

Since at least several of the components, more particularly the video data computer and the video data interfaces, can be controlled for processing or handling respectively, the digital video data depending on their destination, a special control connection is additionally provided via an Ethernet connection between these elements and a control computer. The Ethernet bus concept is known per se and published, for example, in IEEE 802.3: Carrier Sense Multiple Access with Collision detection, New York, IEEE 1985a". The use of the Ethernet for controlling at least several components and the fiber channel concept for data exchange between the components provides that the control and the data exchange within the arrangement is effected so that the arrangement can process video data in real time.

The concept of data exchange in the arrangement makes it possible, on the one hand, to integrate standard computers with standard interfaces. The selected interfaces or connection concepts are known, so that adapter cards, drivers, protocols and the like necessary for this purpose are available. The user has the possibility to select, for example, mixing, cross-fading, noise reduction, color blanking or other video effects by accordingly controlling certain applications. The transmission of the video data by the fiber channel makes a faster transmission possible than bus concepts. Furthermore, this transmission is independent of the video standard, for example, the picture format or display variants.

By an advantageous embodiment of the invention as defined in claim 2, an additional connection between the control computer and the video data computers, on the one hand, and the video data interfaces, on the other hand, are created by means of the PCI bus known in the PC domain. So doing, an additional data exchange between these components may be effected over this widened bus, which data exchange is especially used for exchanging control data. This PCI bus is a bus widely used in the PC domain which is described, for example, in the "PCI (Peripheral Component Interconnect) Local Bus Specification 2.1, PCI Special Interest Group 1995".

The embodiment of the invention provided in accordance with claim 3 makes it possible to integrate hardware components which as such do not have an interface and certainly not such an interface for the fiber channel in the data exchange concept of the arrangement. For this purpose, an interface is inserted between the hardware components to be coupled thereto and the fiber channel.

Since a very fast processing of video data is made possible inside the arrangement because of the data exchange concept, according to the advantageous embodiment claimed in claim 4 video data may be processed in parallel in a plurality of video data computers because the data set necessary for this purpose can be transported not only within the arrangement but also to the exterior.

BRIEF DESCRIPTION OF THE DRAWINGS

In the following, an example of embodiment of the invention will be further explained with reference to the sole FIGURE of the drawing.

DESCRIPTION OF THE PREFERRED EMBODIMENTS

The FIGURE shows in a diagrammatic representation an arrangement 1 for processing digital video data with the data exchange concept according to the invention.

In the arrangement 1 is provided a control computer 2 which is especially used for controlling further components.

In the example of embodiment as shown in the FIGURE, there are four video data computers 3, 4, 5 and 6 which are used for processing video data. The computers can be programmed in accordance with the desired type of processing. Furthermore, the FIGURE shows two video data interfaces 7 and 8 used for applying externally available video data to the arrangement or leading video data processed within the arrangement to the exterior again.

The control computer 2 is connected by a PCI bus 9 to at least several of the video data computers 3, 4, 5, 6 and to the video data interfaces 7 and 8. The video data computers 3, 4, 5 and 6 and also the video data interfaces 7 and 8 can be controlled over this bus.

In the representation in accordance with the FIGURE is further shown a video hardware component 10. There may be a plurality of such video hardware components. Such video hardware components are the video hardware components which are fixedly assigned to certain types of processing which are thus designed for a certain purpose. This purpose may be, for example, mixing of video data, freeing video data from noise or video blanking between video data.

The control of the video hardware component(s) 10 is effected via an RS-422 connection 15 or an Ethernet connection 14 from the control computer 2.

The video hardware component 10 provided in the example of embodiment is coupled via an interface arrangement 11, which is a video data interface, to a fiber channel 12.

In the arrangement as shown in the example of embodiment, a standard computer 13 is further provided which may be, for example, a workstation. In accordance with the variable programming this standard computer can take over universal processing tasks within the arrangement. The standard computer 13 may be used, as required, as a control computer, so that the separate control computer 2 is omitted.

However, if this separate control computer is provided, there is an RS-422 connection 15 between the control computer 2 of the arrangement and the standard computer 13 and also the video hardware component 10, which connection is used for controlling the video hardware component 10 and the standard computer 13 by means of the control computer 2. In lieu of the RS-422 connection 15, it is also possible to use the Ethernet bus 14 for control purposes between the control computer 2 and the video hardware component 10; in that case the RS-422 connection may be omitted.

Furthermore, between these components there may be arranged a JTAG connection (not shown in the FIGURE) also for control purposes, which connection may be used especially for developing applications for the arrangement.

The fiber channel 12 can be used for the fastest data exchange between the video data computers 3, 4, 5 and 6, the video data interfaces 7 and 8 and, via the interface arrangement 11, the video hardware component 10 and the standard computer 13. The fiber channel 12 is faster than known bus concepts and allows of high data rates which may lie above 1 gigabit per second.

The connection between the control computer 2 and the video data computers 3, 4, 5 and 6 and also the video data interfaces 7 and 8 may advantageously be effected by the PCI bus 9, because these components are already installed in a computer housing and the PCI bus is optimized for such purposes. Since the PCI bus has become a standard bus connection, components necessary for this purpose are freely obtainable.

Connections between components of the arrangement which are to be effected by the fiber channel 12 may be set up by means of a switching device 16.

The JTAG connection provided between the control computer 2 and the standard computer 13 and the video hardware component 10 is also widely known and is supported by respective components.

In the overall concept it is possible to provide a very fast data exchange by the various connections between the components within the arrangement according to the invention and to provide a universal control of the components. This makes real-time video data processing possible while, at the same time, the arrangement retains its universal use potential.

What is claimed is:

1. An arrangement for processing digital video data, comprising:
   at least one video data computer,
   at least one video data interface coupled to the at least one video data computer,
   at least one processing device that is configured to process video data from the at least one video data computer, and
   a control computer,
   wherein:
      the video data is exchanged between the at least one video data computer and the processing device through a fiber channel, and
      the control computer controls the processing device via an Ethernet connection or an RS-422 connection.

2. The arrangement as claimed in claim 1, wherein the control computer is connected by a PCI bus to the at least one video data computer and the at least one video data interface.

3. The arrangement as claimed in claim 1, wherein the at least one processing device is coupled to the fiber channel by means of an interface arrangement.

4. The arrangement as claimed in claim 1, wherein at least two video data computers working in parallel are provided which access assigned video data, subject the video data to a computing process and produce the video data as processed video data.

5. The arrangement as claimed in claim 1, wherein the video data comprise at least two video data signals.

6. The arrangement as claimed in claim 1, wherein the connections are established by the fiber channel via a switching device.

7. The arrangement as claimed in claim 1, wherein the at least one processing device includes one or more video hardware components that are configured to provide at least one of:
   mixing, cross-fading, processing, storing or color blanking video data signals.

8. The arrangement as claimed in claim 1, wherein the at least one processing device includes a workstation or a personal computer.

9. The arrangement as claimed in claim 1, wherein the video data is exchanged between the at least one video data computer and the at least one video data interface through the fiber channel.

10. An arrangement for processing digital video data, comprising:
    at least one video data computer;
    at least one video data interface;
    at least one processing device that is configured to process video data from the at least one video data computer with respect to at least one of mixing the video data, reducing noise in the video data, and video blanking between the video data;

a control computer for controlling the at least one processing device; and a fiber channel for exchanging the video data between the at least one video data computer and the at least one processing device to allow real-time processing of the video data, wherein the control computer controls the processing device via an Ethernet connection or an RS-422 connection.

11. The arrangement as claimed in claim 10, wherein the fiber channel is further for exchanging the video data between the at least one video data computer and the at least one video data interface.

12. The arrangement as claimed in claim 10, wherein the control computer is connected by a PCI bus to the at least one video data computer and the at least one video data interface.

13. The arrangement as claimed in claim 10, wherein the at least one processing device is coupled to the fiber channel by means of an interface arrangement.

14. The arrangement as claimed in claim 10, wherein at least two video data computers working in parallel are provided which access assigned video data, subject the video data to a computing process and produce the video data as processed video data.

15. The arrangement as claimed in claim 10, wherein the video data comprise at least two video data signals.

16. The arrangement as claimed in claim 10, wherein the connections are established by the fiber channel via a switching device.

17. The arrangement as claimed in claim 10, wherein the at least one processing device includes a workstation or a personal computer.

* * * * *